Aug. 14, 1928.

O. L. BARNEBEY 1,680,840

PROCESS OF SEPARATING AND RECOVERING GASES

Original Filed July 20, 1920  7 Sheets-Sheet 1

INVENTOR:
Oscar L. Barnebey
BY Ray S. Gehr
ATTORNEY

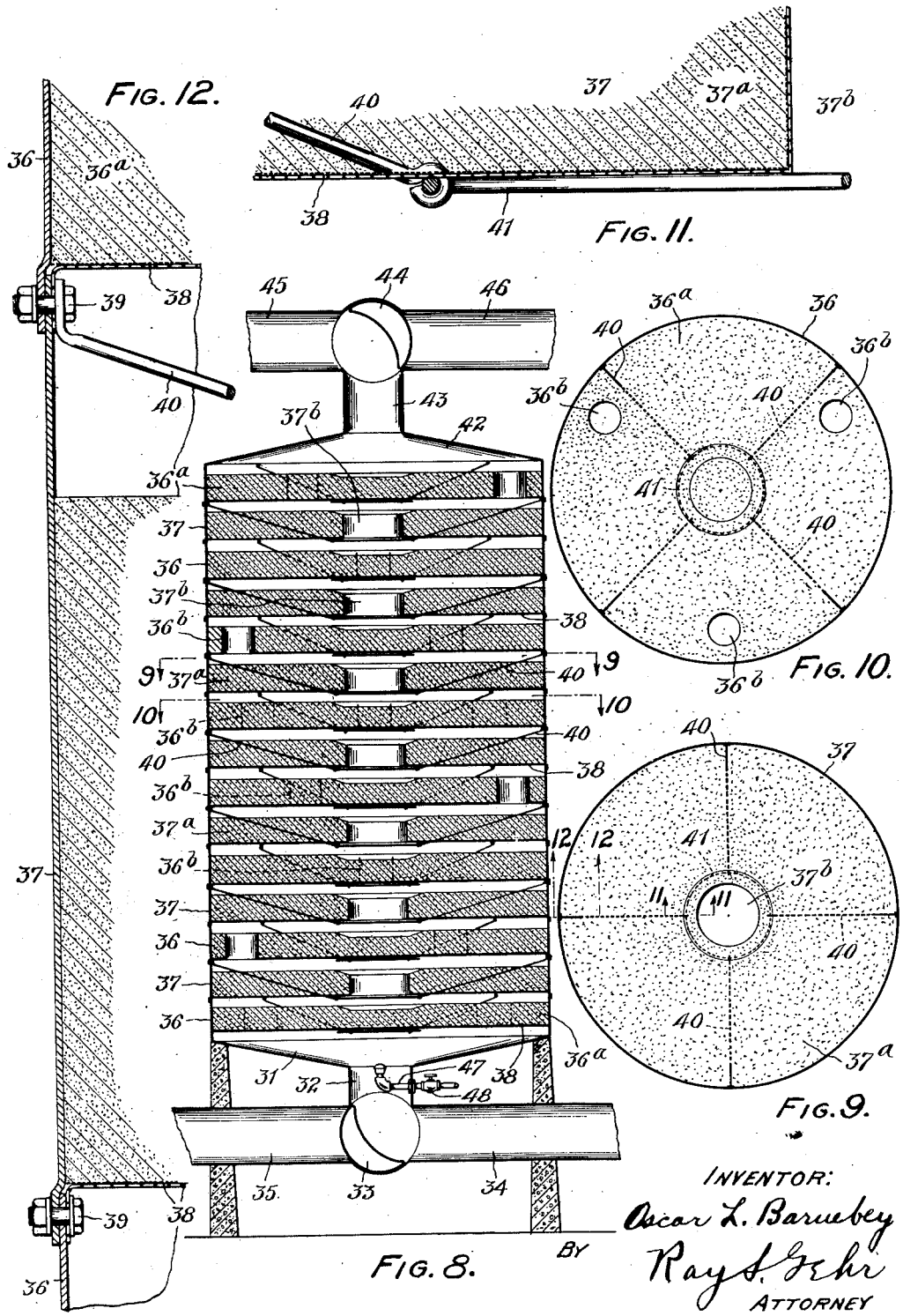

Aug. 14, 1928.

O. L. BARNEBEY 1,680,840

PROCESS OF SEPARATING AND RECOVERING GASES

Original Filed July 20, 1920    7 Sheets-Sheet 4

INVENTOR:
Oscar L. Barnebey
BY Ray S. Gehr
ATTORNEY

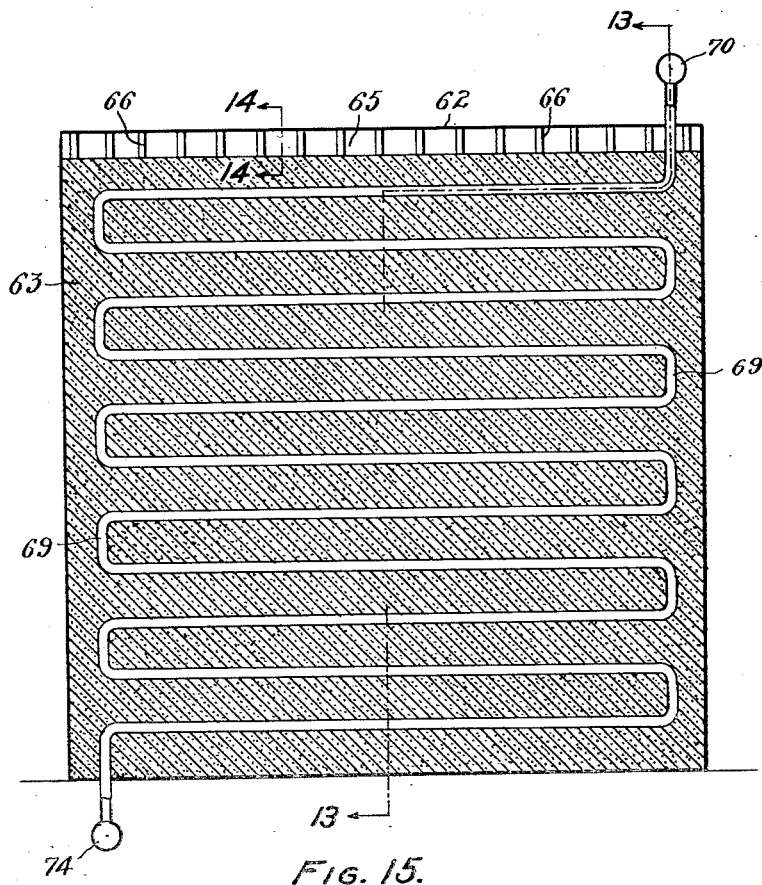

Aug. 14, 1928.  
O. L. BARNEBEY  
1,680,840  
PROCESS OF SEPARATING AND RECOVERING GASES  
Original Filed July 20, 1920  7 Sheets-Sheet 6

INVENTOR:
Oscar L. Barnebey
BY Ray S. Gehr
ATTORNEY

Aug. 14, 1928.

O. L. BARNEBEY 1,680,840

PROCESS OF SEPARATING AND RECOVERING GASES

Original Filed July 20, 1920   7 Sheets-Sheet 7

INVENTOR:
Oscar L. Barnebey
BY Ray A. Fehr
ATTORNEY

Patented Aug. 14, 1928.

1,680,840

UNITED STATES PATENT OFFICE.

OSCAR L. BARNEBEY, OF COLUMBUS, OHIO, ASSIGNOR TO AMERICAN SOLVENT RECOVERY CORPORATION, A CORPORATION OF OHIO.

PROCESS OF SEPARATING AND RECOVERING GASES.

Application filed July 20, 1920, Serial No. 397,745. Renewed February 27, 1928.

The invention relates to an improved process of separating and recovering gases and vapors. In my pending application, Serial Number 348,901, filed January 2, 1920, upon which Letters Patent No. 1,660,642 were granted February 28, 1928, I have disclosed a process of and apparatus for separating and recovering gases, involving the use of an adsorbing medium, preferably highly activated carbonaceous material, by which one or more constituents of the gas or vapor is adsorbed and thus separated from the remaining constituent or constituents. The present invention involves the use of such an adsorption system and presents both an improved process of handling gases and vapors and improved apparatus. I do not, however, claim the apparatus in this application as it is covered by my applications Serial Nos. 578,331 and 578,332 filed as divisions of this application July 29, 1922, upon the latter of which applications Letters Patent No. 1,502,897 were granted July 29, 1924.

One object of the invention is to provide a process of separating the various constituents of a gas or vapor mixture, said process being adapted to the treatment of gaseous mixtures differing as to the kind or kinds and relative amounts of the various constituents to be separated from each other.

Another object of the invention is the provision of an improved process of the character in question by which large volumes of gas can be treated effectively and economically.

Other objects of the invention, more or less incidental or ancillary to the foregoing, will appear in the following description.

When gases and vapors are passed through an adsorptive material, such as activated charcoal, they have a tendency to be adsorbed to a more or less extent, some gases or vapors being adsorbed to a very remarkable degree and others scarcely at all. Due to this distinctive behavior of different gases and vapors many gases or vapors can be separated by adsorbing certain of them, the unadsorbed ones passing through completely or partially free from the adsorbed gases or vapors. Several different conditions arise in such adsorption of gases and vapors, and these conditions the present invention is designed to meet. One condition is that the gas or vapor to be recovered or removed may be present in relatively large percentage in which case the gas mixture can be passed directly through the adsorbing material. Another condition is presented in the adsorption of a gas or vapor when the actual amount of the gas or vapor to be adsorbed is very small and large volumes of the gas mixture must be handled to give a profitable purification or recovery. In such a case increasing the pressure on the gaseous system increases correspondingly the amount of the gas or vapor to be adsorbed per unit of volume. In other cases also pressure may be used to advantage in practising this invention. Also a combination of these methods of treatment frequently can be used to advantage. When the necessary velocity of gases to be handled is low enough to permit it, such gases are passed directly through the adsorbing medium. When the velocity of movement is great in handling large quantities of gas and conditions require the use of a relatively small adsorbing apparatus then the gases are passed over layers of adsorbing material and allowed to diffuse through it. Again the gas mixture can be partially forced through the layers of adsorbing material and partially passed over the surface of the adsorbent and diffused through it. When the concentration of gas or vapor to be adsorbed is rather great the preferred form of the invention is to pass the gas or vapor directly through the layers of the adsorbing medium although specific conditions may alter this somewhat. When the concentration of gas or vapor to be separated is low and large volumes of gas mixture must be handled per unit of time and the back pressure caused by resistance to direct passage of gases through the layers becomes excessive, then a free path is provided for the flow of the gas mixture. In such cases the gas mixture is caused to flow over and between layers of adsorbing material thus giving contact with the adsorbing medium, at the same time causing the gas mixture to diffuse or penetrate into the adsorbing layers in which the gas to be adsorbed is removed from the mixture. A relatively large number of layers are spaced as close together as possible, also the gases are directed in such a manner as to give a stirring or diffusing effect in the inter-layer spaces as the gas mixture passes from one layer of material to the next. In order to handle large volumes of gases which are under normal pressure the gases may be compressed previous to entering the adsorption system thus reducing the gas volume and diminishing the resistance caused by passing gases through the adsorbing medium. The additional pressure also increases the adsorbing capacity of the adsorbent. However, if the pressure is considerably raised, heavier construction of the adsorbing chambers or towers is required.

In working the process, the gas which issues from the adsorbent chambers is depleted wholly or in part of the gas or vapor to be adsorbed. After a period of adsorption the supply of gas is cut off and the adsorbent material is then heated, or subjected to vacuum, or both, to remove the adsorbed gases or vapors. If these gases or vapors have no value they may be discarded, in which case the operation becomes solely a process of purification of the unadsorbed gases. Thus the process is carried on periodically. When the adsorbing material has been fully saturated the adsorbed gas or vapor is removed by heat or vacuum so that the adsorbing power is again given to the adsorbing material and thereupon the cycle can be repeated. When the gases or vapors are removed by heating or by vacuum, this stage is called regeneration of the material or generation of the gas or vapor to be separated.

When the gas or vapor to be removed is water the adsorbing process becomes one of dehydration and this case of vapor removal in accordance with my invention is especially applicable to the dehumidifying or conditioning of air. Other gases which are adsorbed to slight extent can be dried in part or wholly by this invention.

When the unadsorbed gas is air and the adsorbed gases are impurities to be removed from the air the process becomes one of air purification and for this purpose this invention is directly applicable. Likewise other gases can be purified in like manner.

In order that there may be a clear understanding of the manner of practising my invention, I will now describe the same in further detail, referring to the accompanying drawings in which I show several forms of apparatus by which the invention can be practised.

In the drawings, Figure 1 is a central vertical section of an adsorption tower embodying my improvements, the showing being in a measure diagrammatic to permit clearness with a scale of moderate size.

Fig. 5 is a fragmentary vertical section showing the method of joining the sections or units of the tower together.

Fig. 6 is a view corresponding to Fig. 5 but showing a modified form of joint.

Fig. 7 is another view corresponding to Fig. 5 but showing a second modification of the joint construction.

Fig. 8 is a central vertical section, more or less diagrammatic, of a second form of adsorbing tower.

Fig. 9 is a transverse section on the line 9—9, Fig. 8.

Fig. 10 is a transverse section on the line 10—10, Fig. 8.

Fig. 11 is an enlarged fragmentary vertical section on the line 11—11, Fig. 9.

Fig. 12 is an enlarged fragmentary vertical section on the line 12—12, Fig. 9.

Fig. 15 is a vertical section on the line 15—15, Fig. 13.

Figure 18:
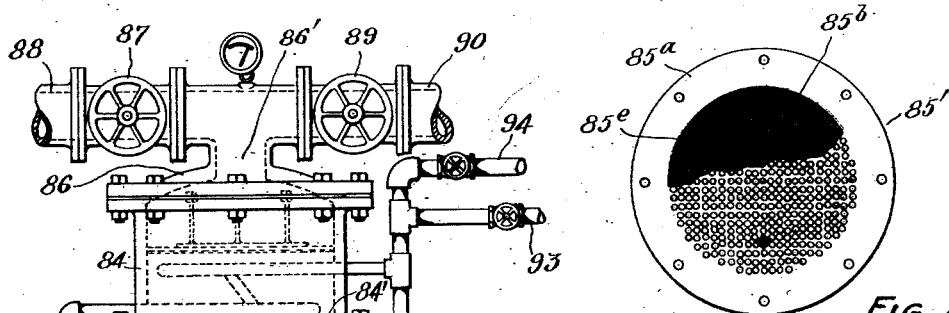
Figure 19:
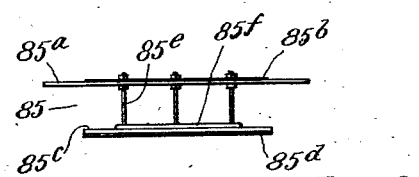
Figure 20:
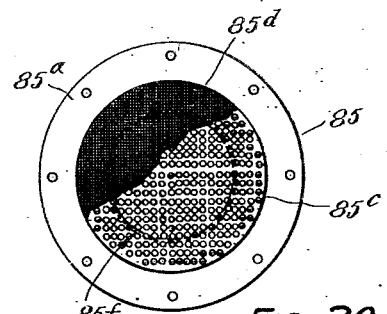

Figs. 18, 19, and 20 are, respectively, a top plan view, side elevation and bottom plan view of one of the separators which are disposed between the layers of adsorbent material.

Figure 16:
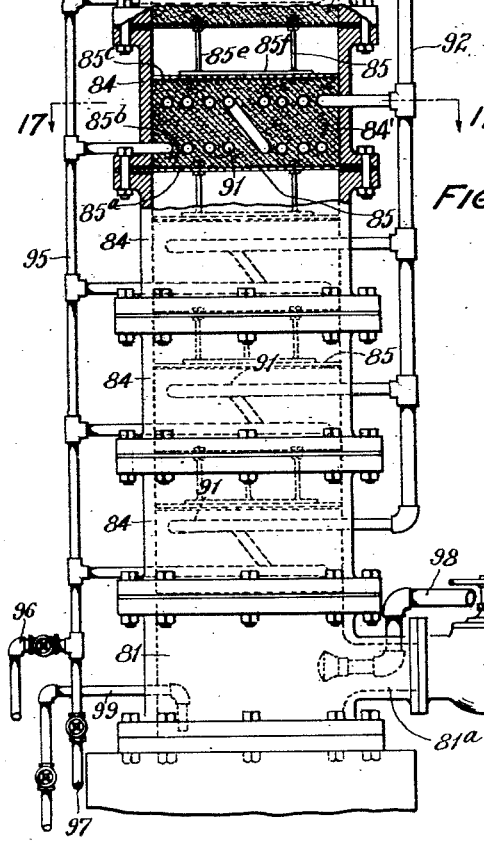
Fig. 16 is a side elevation, partly in section, of a fourth form of adsorbing apparatus.
Figure 21:
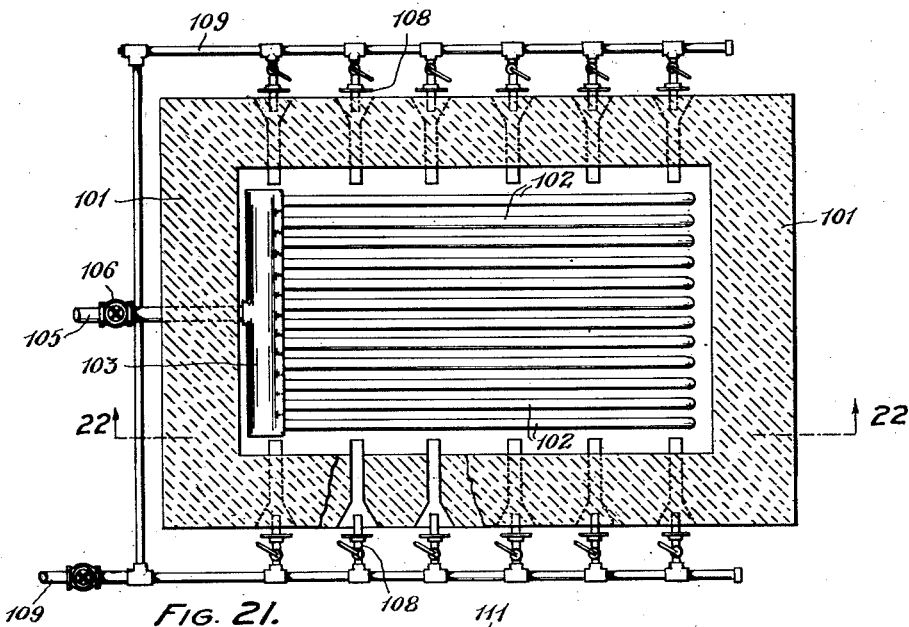
Figure 22:
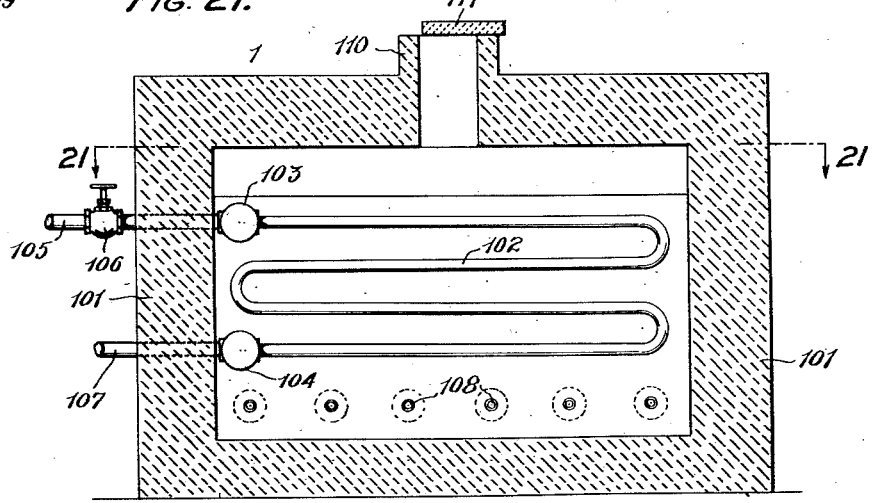

Figs. 21 and 22 are horizontal and vertical sections, respectively, of a steam superheater suitable for use with the adsorbing tower shown in Fig. 16.

Referring first to the form of adsorbing tower shown in Figs. 1 to 7, inclusive, the tower comprises a container preferably made of sheet steel and formed by a series of superposed sections or units. 1 is a base section having an inlet conduit 2 for gas or vapor, said conduit connecting through the casing of valve 3 with a branch 4 adapted to supply the gas mixture to be separated and with a branch 5 adapted to supply hot air or steam.

Mounted on the base section 1 are a series of superposed units or sections 6 which are alike and are joined to each other by gas tight joints such for example as that shown in Fig. 5. As there indicated, the top and bottom edges of each unit are flanged outward to receive a suitable interposed packing 7 and to be tightly clamped together by bolts 8.

On the uppermost one of the units 6 is mounted a top section 9 which constitutes the upper end of the container and is formed with an outlet conduit 10 that connects through the casing of the two way valve 11 with a branch 12 for the discharge of the unadsorbed gases and with a branch 13 for the discharge of the adsorbed gases.

Each of the similar units 6 has one or more layers 14 of adsorbing material. In some aspects of my invention, any suitable adsorbent may be used but I prefer to use a highly activated carbon. A satisfactory form of such carbon is made by carbonizing cocoanut shells or other suitable material and heating the resulting charcoal to bright-red temperature in the presence of oxygenated gases such as steam or carbon dioxide until the adsorptive capacity of the charcoal has been greatly increased. To support the layers of adsorbent each of the units 6 is provided with a transverse diaphragm for each layer carried by the unit. In the preferred form of construction each unit carries a single layer of adsorbent and the unit thus has in its lower part a single diaphragm 15 preferably consisting of a base sheet 15$^a$ of expanded or perforated metal and an overlying sheet 15$^b$ of relatively fine screen. This screen may be made of tinned iron. The expanded metal with its coarse mesh affords the necessary strength to support the layer while the relatively fine screen prevents the granular material from falling through. Where the units 6 are joined as indicated in Fig. 5 the supporting diaphragm 15 may be secured to the units by rivets 16 as shown in said figure.

Figure 1:
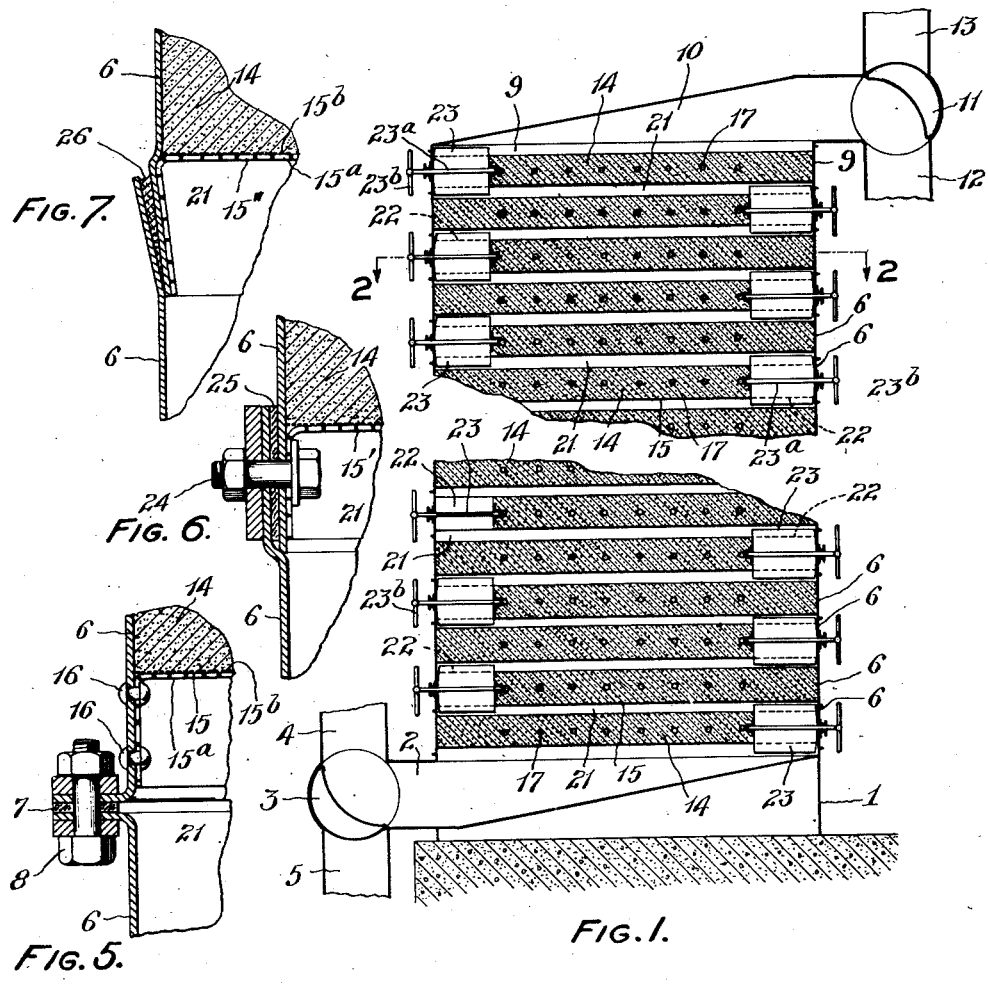
Figure 2:
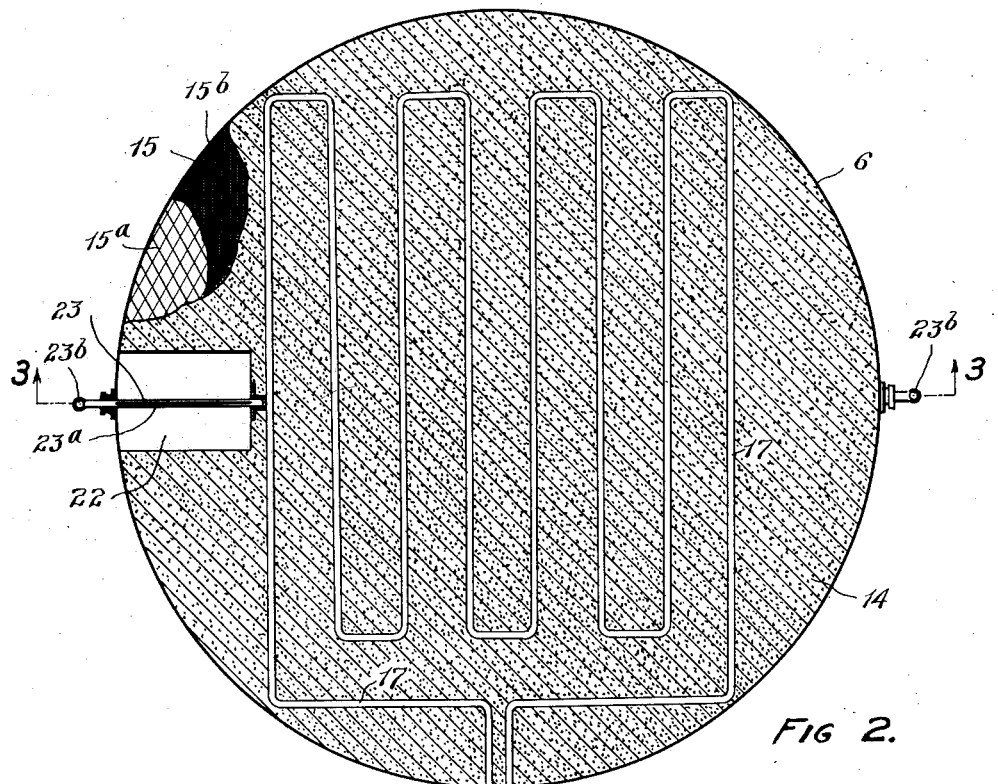
Fig. 2 is an enlarged transverse section on the line 2—2, Fig. 1, some of the parts being broken away to disclose the construction.
Figure 3:
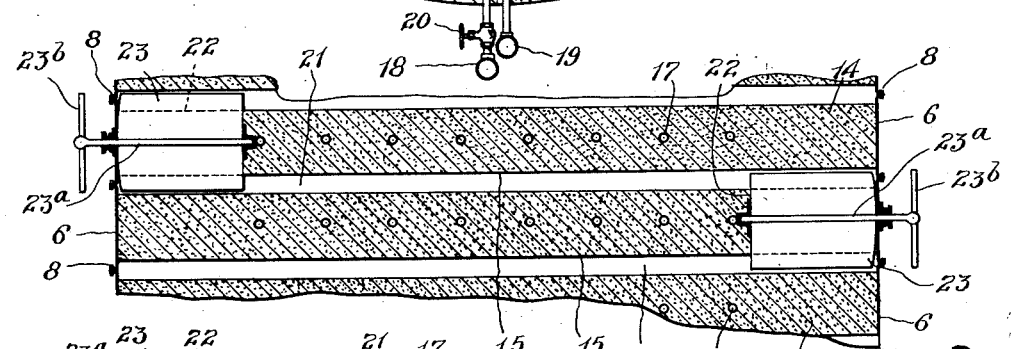
Fig. 3 is a fragmentary vertical section on the line 3—3, Fig. 2.

In each layer of adsorbent is embedded a circuitous pipe or coil 17 which, as indicated in Fig. 2, has one end connected to a supply manifold 18 and its other end connected with a discharge manifold 19. A valve 20 controls the connection between the supply manifold and the pipe 17. The supply manifold 18 may be connected with a source of cold water or the like which can be passed through the pipe 17 to cool the adsorbent, or can be connected with a steam supply for the purpose of heating the adsorbent. The discharge manifold 19 is preferably provided at its lower end with a steam trap.

The positions of the supporting diaphragms 15 and the thickness of the layers of adsorbent are determined so that in the assembled tower the layers 14 are separated from each other by free spaces 21. In the apparatus illustrated in my Letters Patent No. 1,660,642, above referred to, the adsorbent is in a single continuous mass. I find that in such a construction channels tend to be formed in the adsorbent, thus permitting an uneven passage of the gas mixture with resultant loss of efficiency. This I effectively prevent by my present invention since the gas, passing through one relatively thin layer of adsorbent enters one of the spaces 21 in which it moves at low velocity and can freely diffuse and mix before entering the next layer of the series.

In carrying out my present invention the gas may all be forced to pass through the layers of adsorbent, except of course that which is adsorbed, and in some cases, especially where the gas is under considerable pressure, I prefer to follow that practice; but where more moderate pressures are employed I prefer to provide connecting passages between the interlayer spaces 21. These passages can be formed or provided in any manner but are preferably disposed in staggered relation so that gas passing through them is caused to move over first one side of a layer and then its other side. In the construction shown in Figs. 1 to 7 I have formed passages 22 in the adsorbent layers themselves, and I have provided each passage 22 with a swinging leaf valve 23 so that the passage can be left entirely open or partially or entirely closed. As shown each valve has a spindle 23$^a$ which is fitted with a handle 23$^b$ for manual operation. The spindle preferably fits its bearings snugly enough to hold the valve in any adjusted position.

Figure 4:
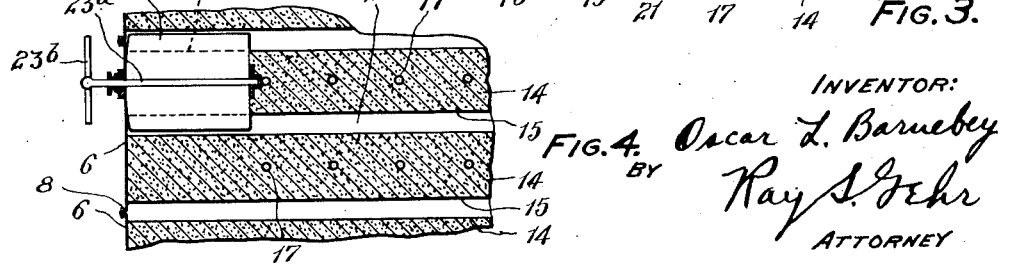
Fig. 4 is a fragmentary vertical section corresponding to that of Fig. 3 but showing a modified construction.

As I have already indicated, each of the similar units of the tower may carry more than one adsorbent layer, and in Fig. 4 I have indicated a construction in which each unit carries two such layers.

In Fig. 6 I have indicated a second form of joint for securing the tower units together. In this construction a series of horizontally disposed bolts 24 serve to clamp the adjacent walls of the sections together with an interposed packing 25 and also serve to secure the diaphragms 15′ in position.

In Fig. 7 still another form of joint is shown in which the adjacent edges of the units are bent as indicated so as to support the diaphragm 15″ and receive a packing 26 which is preferably calked to insure tightness. This packing may be made of suitable fibrous material impregnated with graphite or may be made of soft metal poured into the joint in a molten state.

In the operation of the apparatus above described the gas or vapor mixture to be separated is caused to enter through the branch 4 and the main conduit 2 and pass through and over the adsorbent material 14, the adsorbable gases and vapors being taken up by the adsorbent while the unadsorbable constituents find their way to the outlet conduit 10 and the passage 12. At the beginning of the operation control valves 23 are closed in some of the upper sections, usually about five of them. This causes all the gases not adsorbed to pass directly through the absorbent layers 10 in these upper sections. The other control valves are preferably left open until the upper sections are thoroughly saturated with adsorbable gases and vapors. While this saturation is proceeding the other layers are wholly or partially saturated due to the diffusion of the gases into the granular material. After the upper sections are saturated the control valves of several of the next lower sections are closed and the valves of the upper saturated sections opened. This gradual closing of the valves from the top of the tower downward is continued until the maximum amount of adsorbable gas or vapor has been taken up by each section.

If the heat of adsorption is considerable cold water is passed through the cooling coils 17 continuously during adsorption to maintain the temperature of the adsorbent and the gas as low as possible during the adsorption period.

When the adsorption is complete the valve 3 is moved to cut off the supply of gas mixture to the tower and, preferably, the mixture is then conducted into another tower of the same character.

At the same time the valve 11 is moved to connect the conduit 10 with the discharge branch 13 and the adsorbent material is heated to distil off the adsorbed gas which is conducted out through the branch 13, the gas being condensed and collected by means of a suitable condenser. The adsorbent material is heated by passing hot water or steam through the pipes 17 or by admitting hot air or steam through the conduit 5 into the interior of the tower in direct contact with the adsorbent material, or both means of heating may be employed in conjunction. If the liquid resulting from the condensation of the adsorbed gas is miscible with water then the direct application of steam to the adsorbent material must be dispensed with or, if it is not dispensed with, the resultant mixture of condensed gases and water must be redistilled or otherwise separated. In general it has been found that the direct application of steam to the adsorbent should be avoided in such cases whenever possible and the adsorbed gases or vapors removed by heat applied through the pipes 17. Of course if the condensed gas liquid is immiscible with water, the immiscible layers are readily separated by drawing one off from the other.

When the conditions permit the use of direct steam heating of the adsorbent material, several distinct advantages arise therefrom, namely, (a) the vapor or boiling point of the adsorbed material is lowered so that it can be evolved from the adsorbent at a lower temperature, (b) the heating of the adsorbent is highly uniform, (c) the heating of the adsorbent is rapidly effected, and (d) the latent heat of the steam is efficiently utilized.

When the generation and collection of the previously adsorbed gases or vapors are completed cool water is turned into the coils 17 and the gas valves are again changed to admit the gas mixture and begin a repetition of the above described cycle. Thus the cycle of operations may be repeated indefinitely. Usually the operation of several adsorbing towers in conjunction is advisable so that the operation may be continuous, adsorption going on in one tower while generation of adsorbed gas is proceeding in another tower. The process may be operated under any pressure desired by proper regulation of the exit valve of the tower and of the pressure of the gas supplied thereto, but it will be understood that the construction of the tower must be made heavy and strong enough to withstand the pressure used. It will be observed that both the local pressure and distribution of the gas in the tower can be regulated by the adjustment of the valves 23.

The activated charcoal which I prefer to employ in carrying out my process is granular in form and maintains its physical integrity during periodical adsorption and generation of gas over periods of many months, even when heated by direct application of steam as described. What the ultimate effective life of the adsorbent material under such treatment may be I do not know, but it is great enough, as above indicated, so that it seems proper to state that it is adapted substantially permanently to maintain its physical integrity under varying heat and moisture conditions such as result, for example, from heating the material by the direct contact of steam.

Referring now to the form of apparatus illustrated in Figs. 8 to 12, inclusive, the adsorption tower shown comprises the base section 31 formed with a gas inlet conduit 32 which connects through the casing of the valve 33 with the branch conduit 34 for supplying gas mixtures and with the branch conduit 35 for supplying hot air or steam. On the base section 31 are mounted a series of superposed units 36 and 37 each carrying a supporting diaphragm 38 of the character described in connection with Figs. 1 to 7. Each of the units 36 carries a layer 36$^a$ of adsorbing material, said layer being formed near its periphery with a plurality of vertical passages 36$^b$. Each of the units 37 carries a layer of adsorbent 37$^a$ which is formed with a central passage 37$^b$. Adsorbent layers 36$^a$ and 37$^a$ are supported by diaphragms 38 of expanded metal and fine mesh screen of the character previously described. The diaphragms 38 are secured at their edges by bolts 39 which serve to joint the units 36 and 37 together and are additionally supported by inclined stay rods 40 which are secured at their outer ends by said bolts 39 and are attached as shown in Fig. 11 at their inner ends to central rings 41 underlying the diaphragms 38.

The upper end of the tower is closed by a top section or unit 42 which is formed with a discharge conduit 43 that communicates through the casing of two way valve 44 with a branch 45 for discharge of the unadsorbed gas and with branch 46 for the discharge of the adsorbed gas. A steam pipe 47 opens into the bottom section 31 of the tower and by adjustment of a valve 48 steam may be admitted at will to the interior of the tower.

As in the first form of construction, the adsorbent layers of the tower units are separated by intervening spaces and the passages through the adsorbent layers, in conjunction with said intervening spaces, afford circuitous passages for gas from the bottom to the top of the tower.

In the operation of the second form of apparatus the mixture of gases to be separated is admitted through conduit 34 and the gas passed upward in the tower, some diffusing into and through the layers while some passes by the circuitous passages upward through the tower, gradually diffusing into the adsorbent material until only unadsorbable gas remains to pass out at the top through branch conduit 45.

When the adsorbent material has become saturated with adsorbed gas the valves 33 and 44 are changed, hot air or steam being conducted through the conduit 35 and, if desired, steam may also be admitted through pipe 47 to heat the adsorbent and distil off the adsorbed gas which passes out through conduit 46 to be condensed and collected in the manner previously described. If it is desirable that steam or water vapor be not mixed with adsorbed gas, the adsorbent may be heated by the use of hot air alone. Also in cases where the adsorbed gas is not to be recovered hot air can be applied advantageously to recuperate the adsorbent, and in this case the process becomes one of purification of the unadsorbed gas.

Figure 13:
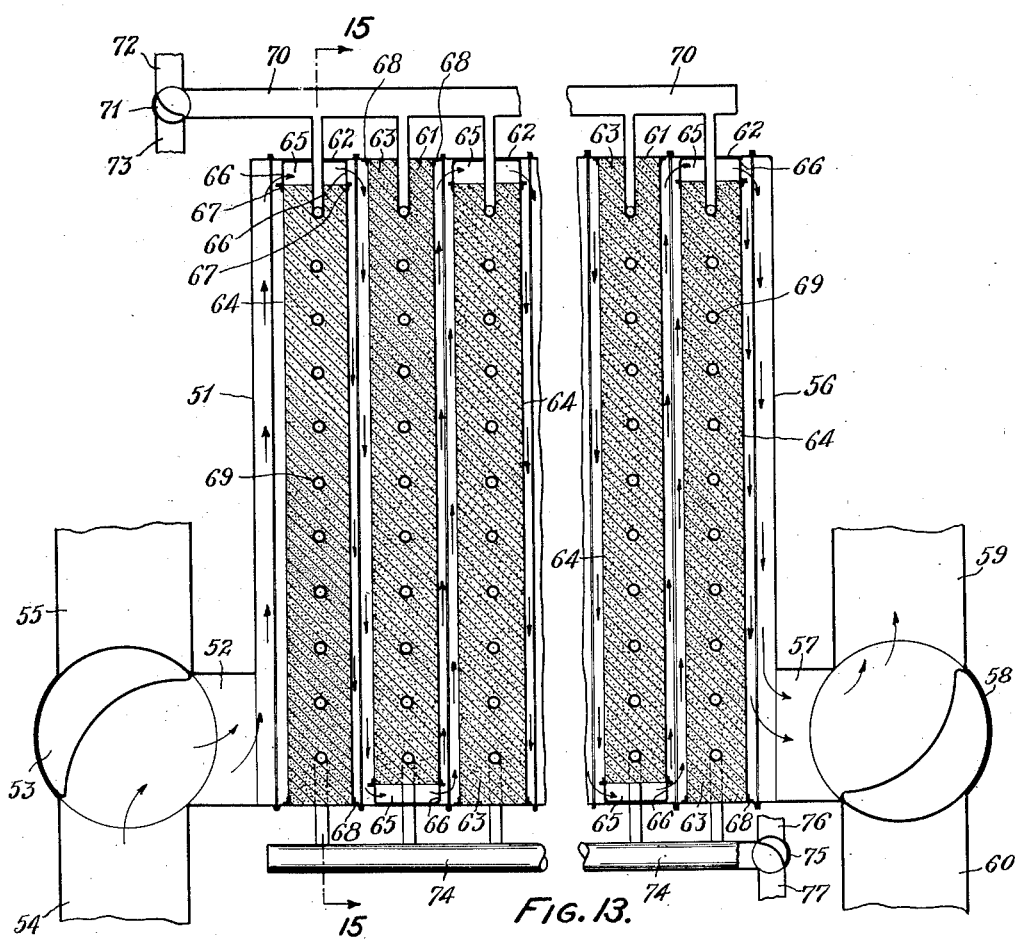
Fig. 13 is a vertical section, more or less diagrammatic, of a third form of adsorbing apparatus, with part of the structure broken away.
Figure 14:
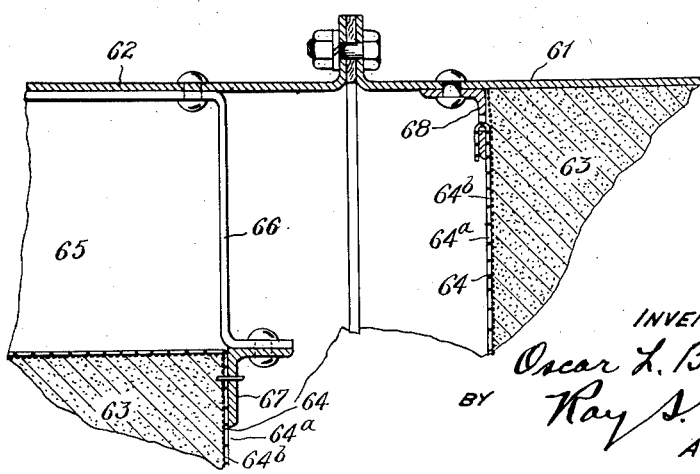
Fig. 14 is an enlarged fragmentary vertical section on the line 14—14, Fig. 15.
Figure 17:
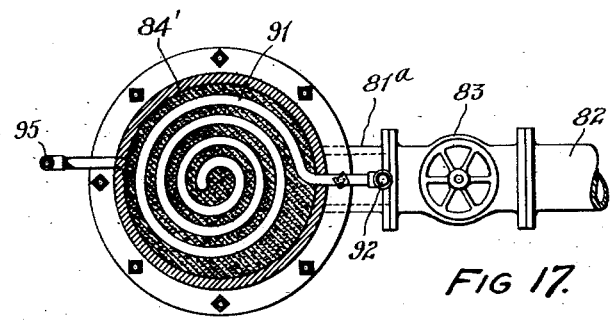
Fig. 17 is a transverse section on the line 17—17, Fig. 16.

In the construction shown in Figs. 13, 14 and 15 the adsorbing apparatus is made up of a series of vertically arranged container units each of which carries a layer of adsorbing material. The end unit 51 is formed at its lower side with an inlet conduit 52 which connects through the casing of valve 53 with an inlet 54 for the gas mixture and also with an inlet 55 for hot air or steam. The section 56 at the opposite end of the apparatus is provided with an outlet conduit 57 which connects through the casing of the valve 58 with a conduit 59 for the discharge of unadsorbed gas and with a conduit 60 for the discharge of adsorbed gas. Between the end sections or units 51 and 56 are a series of units 61 and 62. All of the units are bolted together with gas tight fits as indicated in Fig. 14.

Each of the units carries a layer or slab 63 of adsorbent material. This material is supported between the foraminous walls or diaphragms 64 consisting of a sheet of expanded or perforated metal 64$^a$ and a sheet of wire screening 64$^b$ sufficiently fine to prevent the passage of the granular adsorbent. The layer or slab of adsorbent terminates short of the adjacent top or bottom wall of the container so as to form the passages 65 between the interlayer spaces, alternately at the top and at the bottom of the container, thus affording a continuous circuitous passage from the inlet conduit 52 to the outlet conduit 57.

In Fig. 14 is shown a suitable means for supporting the foraminous walls 64. To provide for the passage 65 supporting straps 66 are riveted to the wall of the container units 61 and 62 and to these straps are riveted angle irons 67 to which the foraminous walls 64 are secured. At the ends of the adsorbent layers opposite the passages 65 the foraminous walls 64 are secured directly to the angle irons 68 which are riveted to the walls of the container units 61 and 62. The foraminous walls are conveniently secured to the angle irons 68 by forming the expanded or perforated metal with tongues which are passed through apertures in the angle irons 68 and bent over, as shown in Fig. 14. Each of the adsorbent layers 63 has embedded in it a coil of pipe 69 which connects at its upper end with a manifold 70, the latter being adapted to be connected through the two way valve 71 with a cold water pipe 72 or a steam pipe 73. The lower ends of the coils 69 connect with a manifold 74 which communicates through a two way valve 75 with a pipe 76 leading to a steam trap and with a pipe 77 which may lead either to a boiler or a waste passage.

The operation of this last form of apparatus is analagous to the operation of the first and second forms. As in the case of the second form of the apparatus no control valves are provided in connection with the individual units and hence, as in the second form of the apparatus, the diffusion and penetration of gases in the granular adsorbent is relied upon to bring about contact of the gases and adsorbent. Consequently in both the second and third forms of apparatus a relatively larger number of units are used than in the first form of construction. The relatively free path throughout allows the second and third forms to be applied to large quantities of gas per unit of time. The stirring effect caused by gas passing around the bends of the circuitous passages constantly brings fresh gas in contact with the outer surface of the adsorbent material. As in the previous cases the pressure within the system of the third form of apparatus is adjusted by the setting of the exit valve 58 and the entrance valve 53 as well as by regulation of the pressure at which the gases are supplied to the system.

In Figs 16 to 20, inclusive, I show a form of apparatus especially adapted for adsorbing gases and vapors under relatively high compression and in Figs. 21 and 22 I have shown a form of steam superheater adapted for use with this high compression apparatus. Referring to Figs. 16 to 20, the adsorption tower is built up of cast iron sections sufficiently heavy throughout to sustain the pressures contemplated. This tower comprises a base section 81 arranged on a suitable foundation and formed with an inlet conduit $81^a$ for the gas mixture to be treated. Said inlet conduit $81^a$ connects with a supply conduit 82 through a control valve 83. On the base section 81 are arranged a series of superposed units 84 each of which carries a layer of 84' of adsorbent material. The adsorbent layers 84' are supported and separated from each other by separators 85 each of which comprises a plate of expanded or perforated metal $85^a$ a sheet of wire screening $85^b$, a lower sheet of expanded or perforated metal $85^c$, a sheet of screening $85^d$ and depending rods $85^e$ joined to a ring $85^f$ that is joined to sheet plate $85^c$, the rods $85^e$ and ring $85^f$ serving to definitely separate the bottom plate $85^c$ from the top plate $85^a$. The peripheral part of each plate $85^a$ is clamped between the flanges of two of the units 84 so that the plate $85^a$ serves to support one layer of adsorbent while the plate $85^c$ suspended from it overlies the top of the next lower layer and, with the screen $85^d$, holds the material of the latter layer in place against the considerable upward pressure of the gas.

On the uppermost unit 84 is arranged a top unit 86 with discharge conduit 86' that communicates through valve 87 with a discharge pipe 88 for the unadsorbed gases and through valve 89 with discharge pipe 90 for the adsorbed gases.

In each adsorbent layer is embedded a coil of pipe 91 which communicates at one end with a manifold 92 the latter being connected in turn with a cold water supply pipe 93 and a steam pipe 94. The other ends of the coils 91 connect with the manifold 95 which in turn is connected with a discharge pipe 96 for water and a discharge pipe 97 for steam, the pipe 97 preferably leading to a steam trap.

The steam and water pipes 93, 94, 96 and 97 are fitted with suitable control valves as shown.

A supply pipe 98 for superheated steam leads into the base section 81 so that superheated steam can be introduced into direct contact with the adsorbent material. The base section 81 is fitted with a siphon discharge pipe 99 which is adapted to effect the discharge of both the condensed gas which may result from the operation of the system at a relatively high pressure and of condensed steam in case steam is introduced into direct contact with the adsorbent.

The steam superheater shown in Figs. 21 and 22 comprises fire brick walls 101 in which is arranged a series of steam pipes 102 which are connected at their upper ends to an inlet manifold 103 and at their lower ends to an outlet manifold 104. An inlet pipe 105 with suitable control valve 106 is adapted to conduct steam from the boiler to the inlet manifold 103 while a discharge pipe 107 is adapted to conduct the superheated steam to the pipes 94 and 98 of the adsorption tower.

The steam coils 102 are heated by two series of gas burners 108 which project through the fire brick walls 101, fuel gas being supplied to the burners through a pipe 109.

The top wall of the furnace is formed with a discharge flue 110 and a slab 111 of ceramic material serves as a damper to control the rate of escape of the combustion gases.

As has been stated above, this last form of apparatus is especially adapted to gases and vapors under high pressures. These high pressures gradually condense the gas and allow much more gas by weight to be handled per unit of time. The structure is made heavy to correspond to the pressures involved. This apparatus in operation differs from the second and third forms of construction in that all of the unadsorbed gases must pass directly through the adsorbent, though in this respect the apparatus resembles the first form of construction when the latter is operated with the valves in the several units closed. The use of superheated steam and this high compression apparatus both directly and indirectly causes a high tempearture during the generating periods and a high percentage of removal of adsorbed gases is secured. As in the previous forms of apparatus several towers should be used, rotating adsorbing and generating cycles to give continuity of process. Inasmuch as the force of compression has the effect of condensing vapors and high boiling point gases the syphon 99 is provided to remove such condensates as may accumulate in the bottom chamber of the tower. Condensed steam may also be trapped off through this syphon.

As was noted in the first part of this specification, the operation under pressure is especially advantageous for the adsorption and separation of gaseous constituents in diluted form because increasing the pressure of the gaseous mixture increases correspondingly the amount of the gas to be adsorbed per unit of mixture volume. In treating gaseous mixtures of this character it is advantageous, after determining a suitable pressure for any particular one, to compress the different mixtures to pressures inversely proportional to the ratios of adsorbable to unadsorbable constituents of said mixtures.

The process and the various forms of apparatus above described may be varied or modified in a number of respects that will readily occur to those skilled in the art. For example the generation of the adsorbed gas or gases may be effected in whole or in part by subjecting the chamber of the adsorbing power to a vacuum. Apparatus for producing a vacuum suitable for this purpose is well known and has therefore not been described. It will be understood that such apparatus can be connected either directly with the adsorbing tower or through a condenser as may be desired. Again, any of the known forms of apparatus for supplying gas under pressure can be employed to supply gas mixture to the adsorbing tower. In some applications of the process, obviously various modifications of the embedded heating and cooling devices can be used. Cooling water can be sprayed directly on the adsorbent thereby giving very rapid cooling of the latter and simplifying the construction of the apparatus.

Obviously the layers of adsorbent can be varied in thickness according to the character of the adsorbent used and the conditions of the operation. Indeed, in so far as some aspects of my present invention are concerned, the adsorbent may be arranged in a single layer or mass.

Again I have indicated the passages between the interlayer spaces as formed in the layers themselves, but it will be obvious that such passages may be formed in any way adapted to interconnect said spaces.

While I have shown the last form of the apparatus (Figs. 16 to 20) with especially heavy construction to fit it for gases under high compression, it will be understood that the other forms of apparatus, especially the first form, can be used for high compression operation by making the various parts suitably heavy. It will also be seen that while the different forms of apparatus differ in construction and in form they have certain essential features in common. In each case the gas mixture is admitted to contact with one layer after another of the adsorbent material and in passing from one layer to another is caused to enter a free space in which it is diffused and mixed. Thus the mixture of the gases is uniform at any particular stage of its progress through the adsorbing tower and is uniformly presented to the entire surface of each successive layer of adsorbent. And the suitable number of layers used insures the substantially uniform treatment of the gas with resulting thorough separation of the adsorbable constitutents from the unadsorbable constituents.

Again in the case of each form of apparatus a sectional or unit construction is employed which both facilitates the manufacture and assembly, reduces the cost of the apparatus and makes it highly flexible in meeting various conditions of operation, it being possible by reason of the unit construction to readily assemble the adsorbing tower with any desirable number of units to meet different conditions.

My improved process has many different applications, to some of which certain forms of apparatus above described are better suited than others. Thus the first form of apparatus is especially adapted to the recovery of ether or alcohol. The second form of apparatus is adapted to dehydrate air and other gases and to recover gases like carbon tetrachloride for use in solvent extraction. The third form of apparatus is well adapted to the removal of sulphur dioxide from smelter fumes and to the recovery of gases like benzol from contaminated air. The fourth form of apparatus is especially adapted to the removal of pyridine from ammonia, gasoline from natural gas and benzol and toluol from artificial gas. For many purposes the different forms of apparatus are interchangeable and each may be used under a variety of conditions. The first form of apparatus in particular is adapted to a very great variety of operating conditions. It will, of course, be understood that in some cases both the adsorbed and unadsorbed constituents are recovered while in other cases one or the other is discharged to waste.

In the foregoing description I have referred both to gases and vapors, but in the appended claims I use the term gas or gases as comprehensive of both gases and vapors.

It is to be understood that the particular procedures described and the particular forms of apparatus illustrated are presented for purposes of explanation and are not intended to limit the scope of the invention except as may be indicated by the appended claims.

What I claim is:

1. The process of separating the constituents of gaseous mixtures which comprises passing the mixture under pressure above that of the atmosphere successively through a plurality of separated layers of solid adsorbent material and interposed spaces, the said adsorbent material being adapted to adsorb a certain constituent or constituents of said mixture and permit other constituents to pass therethrough and the interposed spaces being adapted to permit the gas emerging from one layer of adsorbent material to thoroughly diffuse therein before entering the next layer, and then driving off the adsorbed gas from said material.

2. The process of separating the constituents of gaseous mixtures which comprises passing the mixture successively through a plurality of separated layers of solid adsorbent material and interposed spaces, the said adsorbent material being adapted to adsorb a certain constituent or constituents of said mixture and permit other constituents to pass therethrough and the interposed spaces being adapted to permit the gas emerging from one layer of adsorbent material to thoroughly diffuse therein before entering the next layer, and then driving off the adsorbed gas from said material.

3. The process of separating the constituents of gaseous mixtures which comprises passing the mixture under pressure above that of the atmosphere successively through a plurality of separated layers of solid adsorbent material and interposed spaces, the said adsorbent material being adapted to adsorb a certain constituent or constituents of said mixture and permit other constituents to pass therethrough and the interposed spaces being adapted to permit gas emerging from one layer of adsorbent material to thoroughly diffuse therein before entering the next layer, cooling the adsorbent material while the gaseous mixture is being passed therethrough, and then driving off the adsorbent gas from said material.

4. The process of separating the constituents of gaseous mixtures which comprises passing the mixture successively through a plurality of separated layers of solid adsorbent material and interposed spaces, the said adsorbent material being adapted to adsorb a certain constituent or constituents of said mixture and permit other constituents to pass therethrough and the interposed spaces being adapted to permit the gas emerging from one layer of adsorbent material to thoroughly diffuse therein before entering the next layer, cooling the adsorbent material while the gaseous mixture is being passed therethrough, and then driving off the adsorbed gas from said material.

5. In a process of separating constituents of a gaseous mixture, the steps which comprise passing the gaseous mixture through a layer of material the physical integrity of which is unaffected by moisture and which is adapted to adsorb a certain constituent or constituents of the mixture and permit other constituents to pass therethrough, passing the mixture through a space in which the gas is permitted to thoroughly diffuse, and then passing the mixture through another layer of similar adsorbent material.

6. The process of separating the constituents of gaseous mixtures which comprises passing the mixture into a solid adsorbent material adapted substantially permanently to maintain its physical integrity under varying moisture and heat conditions and to adsorb a certain constituent or constituents of said mixture and permit other constituents to pass, heating the adsorbent material and adsorbed gas directly with steam to distill off the absorbed gas from the said material, and condensing the distillate.

7. The process of separating the constituents of gaseous mixtures which comprises passing the mixture into a solid adsorbent material adapted substantially permanently to maintain its physical integrity under varying moisture and heat conditions and to adsorb a certain constituent or constituents of said mixture and permit other constituents to pass, heating the adsorbent material and adsorbed gas directly with steam to distill off the adsorbed gas from the said material, and condensing and separating the distillate.

8. The process of separating the constituents of gaseous mixtures which comprises passing the mixture into a solid adsorbent material adapted substantially permanently to maintain its physical integrity under varying moisture and heat conditions and to adsorb a certain constituent or constituents of said mixture and permit other constituents to pass, heating the adsorbent material and adsorbed gas directly with steam and by conduction from steam coils to distill off the adsorbed gas from the said material, and condensing and separating the distillate.

9. The process of separating the constituents of gaseous mixtures which comprises passing the mixture into a solid adsorbing material adapted substantially permanently to maintain its physical integrity under varying moisture and heat conditions and to adsorb a certain constituent or constituents of said mixture and permit other constituents to pass, heating the adsorbent material and adsorbed gas directly with super-heated steam and by conduction from steam coils supplied with super-heated steam to distill off the adsorbed gas from the said material, and condensing and separating the distillate.

10. The process of separating the constituents of gaseous mixtures which comprises passing the mixture into a solid adsorbent material adapted substantially permanently to maintain its physical integrity under varying moisture and heat conditions and to adsorb a certain constituent or constituents of said mixture and permit other constituents to pass, meanwhile cooling the adsorbing material, then heating the adsorbent material and adsorbed gas directly with steam to distill off the adsorbed constituent, and condensing the distillate.

11. The process of separating the constituents of gaseous mixtures which comprises passing the mixture into a solid adsorbent material adapted substantially permanently to maintain its physical integrity under varying moisture and heat conditions and to adsorb a certain constituent or constituents of said mixture and permit other constituents to pass, meanwhile cooling the adsorbing material, then heating the adsorbent material and adsorbed gas directly with steam to distill off the adsorbed constituent, and condensing and separating the distillate.

12. The process of separating the constituents of gaseous mixtures which comprises passing the mixture into a solid adsorbent material adapted substantially permanently to maintain its physical integrity under varying moisture and heat conditions and to adsorb a certain constituent or constituents of said mixture and permit other constituents to pass, meanwhile cooling the adsorbing material, heating the adsorbent material by conduction from steam coils containing steam, meanwhile introducing steam directly into the adsorbent material to distill off the adsorbed gas, and condensing and separating the distillate.

13. The process of separating constituents of gaseous mixtures which comprises passing the mixture into a solid adsorbent material adapted to adsorb a certain constituent or constituents of said mixture and permit other constituents to pass, heating the adsorbent material and adsorbed gas directly with steam to distill off the adsorbed gas from said material, and cooling the adsorbent material by direct application of water thereto in preparation for the succeeding treatment of gaseous mixture.

14. The process of separating constituents of gaseous mixtures which comprises passing the mixture into a solid adsorbent material adapted to adsorb a certain constituent or constituents of said mixture and permit other constituents to pass, heating the adsorbent material and adsorbed gas directly with steam to distill off the adsorbed gas from said material, and cooling the adsorbent material in preparation for the succeeding treatment of gaseous mixture.

15. In a process of separating gases, passing a gaseous mixture into activated carbon and removing the adsorbable portion from said gaseous mixture by the activated carbon while allowing the unadsorbable portion to pass, expelling the adsorbed portion from the activated carbon by introducing steam into the carbon carrying the adsorbed gaseous material, cooling and collecting the gaseous matter thus expelled.

16. In a process of separating gases, passing a gaseous mixture into activated carbon and removing the adsorbable portion from said gaseous mixture by the activated carbon while allowing the unadsorbable portion to pass, expelling the adsorbed portion from the activated carbon by introducing steam into the carbon carrying the adsorbed gaseous material and by indirect heat from coils embedded in said activated carbon, and liquefying the gaseous matter thus expelled with the aid of cooling.

17. In a process of separating gases, passing a gaseous mixture into activated carbon and removing the adsorbable portion from said gaseous mixture by the activated carbon while allowing the unadsorbable portion to pass, expelling the adsorbed portion from the activated carbon by heating the latter directly with steam while subject to the action of a vacuum, and collecting said expelled portion.

18. In a process of separating gases, passing a gaseous mixture into activated carbon and removing the adsorbable portion from said gaseous mixture by the activated carbon while allowing the unadsorbable portion to pass, meanwhile cooling the said carbon, expelling the adsorbed portion of gas from the activated carbon by introducing steam into the carbon carrying the adsorbed gaseous mixture, cooling and collecting gaseous material thus expelled.

19. In a process of separating gases, passing a gaseous mixture into activated carbon and removing the adsorbable portion from said gaseous mixture by the activated carbon while allowing the unadsorbable portion to pass, meanwhile cooling the said carbon, expelling the adsorbed portion of gas from the activated carbon by introducing steam into the carbon carrying the adsorbed gaseous material and by indirect heat from coils imbedded in said carbon, and liquefying the gaseous matter with the aid of cooling.

20. In a process of separating gases, passing a gaseous mixture into activated carbon and removing the adsorbable portion from said gaseous mixture by the activated carbon while allowing the unadsorbable portion to pass, expelling the adsorbed portion from the activated carbon by introducing steam into the carbon carrying the adsorbed gaseous material, and liquefying the gaseous matter thus expelled with the acid of cooling.

21. The art of separating adsorbable constituents from unadsorbable constituents from gaseous mixtures having different compositions which comprises passing such a mixture into contact with adsorbent material at an initial pressure varying inversely as the ratio of adsorbable to unadsorbable constituents of the untreated mixture varies, and driving off the adsorbed gases from the adsorbent material.

22. The art of separating adsorbable constituents from unadsorbable constituents from gaseous mixtures having different composition which comprises passing such a mixture into contact with adsorbent material at an initial pressure varying inversely as the ratio of adsorbable to unadsorbable constituents of the untreated mixture varies, meanwhile cooling the adsorbent materials, and driving off the adsorbed gases from the adsorbent material.

In testimony whereof, I hereunto affix my signature.

OSCAR L. BARNEBEY.